(12) United States Patent
Rais-Ghasem et al.

(10) Patent No.: US 10,242,046 B2
(45) Date of Patent: *Mar. 26, 2019

(54) SEARCH-BASED DETECTION, LINK, AND ACQUISITION OF DATA

(71) Applicant: International Business Machines Corporation, Armonk, NY (US)

(72) Inventors: Mohsen Rais-Ghasem, Ottawa (CA); Robin N. Grosset, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/074,763

(22) Filed: Mar. 18, 2016

(65) Prior Publication Data

US 2016/0217180 A1 Jul. 28, 2016

Related U.S. Application Data

(63) Continuation of application No. 14/606,844, filed on Jan. 27, 2015.

(51) Int. Cl.
*G06F 17/30* (2006.01)

(52) U.S. Cl.
CPC .. *G06F 17/30401* (2013.01); *G06F 17/30528* (2013.01)

(58) Field of Classification Search
CPC ......... G06F 17/30336; G06F 17/30401; G06F 17/30466; G06F 17/30415; G06F 17/30424; G06F 17/30454
See application file for complete search history.

(56) References Cited

U.S. PATENT DOCUMENTS

| | | | | |
|---|---|---|---|---|
| 5,357,608 | A * | 10/1994 | Bartow | G06F 15/17 375/257 |
| 6,138,123 | A * | 10/2000 | Rathbun | G06F 17/30958 |
| 6,629,097 | B1 * | 9/2003 | Keith | G06F 17/30598 |
| 6,718,336 | B1 | 4/2004 | Saffer et al. | |
| 7,283,951 | B2 * | 10/2007 | Marchisio | G06F 17/271 704/9 |

(Continued)

FOREIGN PATENT DOCUMENTS

| CN | 101493830 A | 7/2009 |
|---|---|---|
| CN | 104298683 A | 1/2015 |

OTHER PUBLICATIONS

Office Action from U.S. Appl. No. 14/606,844, dated May 4, 2017, 14 pp.

(Continued)

*Primary Examiner* — Daniel A Kuddus
(74) *Attorney, Agent, or Firm* — Shumaker & Sieffert, P.A.

(57) ABSTRACT

A computing device receives a natural language query. The computing device determines, based on the natural language query, a set of search criteria. The computing device determines, from a plurality of data sets, two or more data sets that are relevant to the natural language query based at least in part on matches between the set of search criteria and attributes of the plurality of data sets. The computing device joins the two or more data sets, including joining one or more rows and one or more columns of the two or more data sets to produce a joint data set. The computing device outputs a representation of the joint data set.

10 Claims, 8 Drawing Sheets

(56) References Cited

U.S. PATENT DOCUMENTS

| | | | |
|---|---|---|---|
| 8,375,014 B1* | 2/2013 | Brocato | G06F 17/30297 707/705 |
| 2003/0233224 A1* | 12/2003 | Marchisio | G06F 17/271 704/4 |
| 2004/0015783 A1* | 1/2004 | Lennon | G06F 17/30389 715/235 |
| 2004/0221235 A1* | 11/2004 | Marchisio | G06F 17/271 715/261 |
| 2010/0106724 A1 | 4/2010 | Anderson | |
| 2011/0314010 A1 | 12/2011 | Ganti et al. | |
| 2012/0041950 A1 | 2/2012 | Koll et al. | |
| 2012/0233210 A1 | 9/2012 | Bogosian | |
| 2013/0151572 A1* | 6/2013 | Brocato | G06F 17/30297 707/805 |
| 2014/0046936 A1 | 2/2014 | John | |
| 2014/0072948 A1 | 3/2014 | Boguraev et al. | |
| 2014/0279677 A1 | 9/2014 | Grosset et al. | |
| 2015/0026153 A1* | 1/2015 | Gupta | G06F 17/30336 707/711 |
| 2016/0179857 A1 | 6/2016 | Cosma et al. | |

OTHER PUBLICATIONS

"American Time Use Survey," ATUS Nov. 2003 Multi-Year Microdata Files, U.S. Bureau of Labor Statistics, retrieved from http://data.bls.gov/cgi-bin/print.pl/tus/datafiles_0312.htm on Oct. 13, 2014, 2 pp.

U.S. Appl. No. 14/606,844, filed Jan. 27, 2015 by Mohsen Rais-Ghasem et al.

"List of IBM Patents or Patent Applications Treated as Related," Appendix P, 2 pp.

Response to Office Action dated May 4, 2017, from U.S. Appl. No. 14/606,844, filed Aug. 4, 2017, 17 pp.

Office Action from U.S. Appl. No. 14/606,844, dated Nov. 27, 2017, 15 pp.

Response to Office Action dated Nov. 27, 2017, from U.S. Appl. No. 14/606,844, filed Jan. 24, 2018, 18 pp.

Advisory Action from U.S. Appl. No. 14/606,844, dated Feb. 6, 2018, 3 pp.

Office Action from U.S. Appl. No. 14/606,844 dated Aug. 10, 2018, 14 pp.

Response to Office Action dated Aug. 10, 2018, from U.S. Appl. No. 14/606,844, filed Nov. 6, 2018, 11 pp.

* cited by examiner

SEARCH-BASED DETECTION, LINK, AND ACQUISITION OF DATA

This application is a Continuation of application Ser. No. 14/606,844, filed Jan. 27, 2015, the entire content of which is hereby incorporated by reference.

TECHNICAL FIELD

The disclosure relates to business intelligence systems, and more specifically relates to the acquisition of data that are relevant to a query.

BACKGROUND

Enterprise software system may include financial planning systems, budget planning systems, order management systems, inventory management systems, sales force management systems, business intelligence tools, enterprise reporting tools, project and resource management tools, and the like. The enterprise software system may maintain, link to, or otherwise manage relevant data. Increasingly, such data are stored in a variety of storage mechanisms and schema in a variety of data sources, including both data sources that are internal to the enterprise software system as well as data sources that are external to the enterprise software system. For example, the enterprise software system may include one or more databases as part of the enterprise software system. The enterprise software system may also link to data sources that are external to the enterprise software system, such as external web sites, remote databases, and the like.

SUMMARY

In general, aspects of the present disclosure are directed to techniques for the acquisition and linking of data that are relevant to a natural language query. An enterprise software system may receive and parse a natural language query to determine a set of search criteria. The enterprise business intelligence system may determine multiple data sets that best match the set of search criteria based on semantic annotation of the data sets. The data sets may be of a variety of data formats and may be stored in a variety of data sources both internal to and external to the enterprise business intelligence system. The enterprise business intelligence system may combine the multiple data sets into a combined data set which may be returned to provide an answer to the natural language query.

In one aspect, the disclosure is directed to a method. The method may include receiving, by a computing device, a natural language query. The method may further include determining, by the computing device and based on the natural language query, a set of search criteria. The method may further include determining, by the computing device and from a plurality of data sets stored in one or more storage devices, two or more data sets that are relevant to the natural language query based at least in part on matches between the set of search criteria and attributes of the plurality of data sets. The method may further include joining, by the computing device, the two or more data sets, including joining one or more rows and one or more columns of the two or more data sets to produce a joint data set. The method may further include outputting, by the computing device, a representation of the joint data set.

In another aspect, the disclosure is directed to a computer system. The computer system may include one or more processors, one or more computer-readable memories, and one or more computer readable, tangible storage devices. The computer system may further include program instructions, stored on at least one of the one or more storage devices for execution by at least one of the one or more processors via at least one of the one or more memories, to receive a natural language query. The computer system may further include program instructions, stored on at least one of the one or more storage devices for execution by at least one of the one or more processors via at least one of the one or more memories, to determine, based on the natural language query, a set of search criteria. The computer system may further include program instructions, stored on at least one of the one or more storage devices for execution by at least one of the one or more processors via at least one of the one or more memories, to determine, from a plurality of data sets stored in at least one of the one or more storage devices, two or more data sets that are relevant to the natural language query based at least in part on matches between the set of search criteria and attributes of the plurality of data sets. The computer system may further include program instructions, stored on at least one of the one or more storage devices for execution by at least one of the one or more processors via at least one of the one or more memories, join the two or more data sets, including joining one or more rows and one or more columns of the two or more data sets to produce a joint data set. The computer system may further include program instructions, stored on at least one of the one or more storage devices for execution by at least one of the one or more processors via at least one of the one or more memories, to output a representation of the joint data set.

In another aspect, the disclosure is directed to a computer product comprising a computer-readable storage medium having program code embodied therewith. The program code may be executable by a computing device to receive a natural language query. The program code may be further executable by the computing device to determine, based on the natural language query, a set of search criteria. The program code may be further executable by the computing device to determine, from a plurality of data sets, two or more data sets that are relevant to the natural language query based at least in part on matches between the set of search criteria and attributes of the plurality of data sets. The program code may be further executable by the computing device to join the two or more data sets, including joining one or more rows and one or more columns of the two or more data sets to produce a joint data set. The program code may be further executable by the computing device to output a representation of the joint data set.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for the acquisition and linking of data by an enterprise software system that is relevant to a query. Given the heterogeneity of data that is managed by an enterprise software system, it may be challenging for an enterprise software system to efficiently determine which of its managed data are relevant to a received query as well as how to combine relevant data from disparate data sets into a joint data set that may be presented by the enterprise software system to answer the query.

To potentially better determine data that are relevant to a given query, the enterprise software system may catalogue and index data sets that it manages, including semantically annotating each data set. In response to receiving a query, the enterprise software system may parse the query to determine a set of search criteria included in the query, and may perform matching between the set of search criteria and the semantic annotations of data sets to determine one or more data sets that are most relevant to the query. If a combination of relevant data sets may better cover the search criteria of the query than individual data sets alone, the enterprise software system may determine, based upon various heuristic rules, how multiple data sets may be merged into a joint data set. In this way, the enterprise software system may present a single joint data set as a response to the query potentially without the need for extensive prior modeling of data sets.

Figure 1:
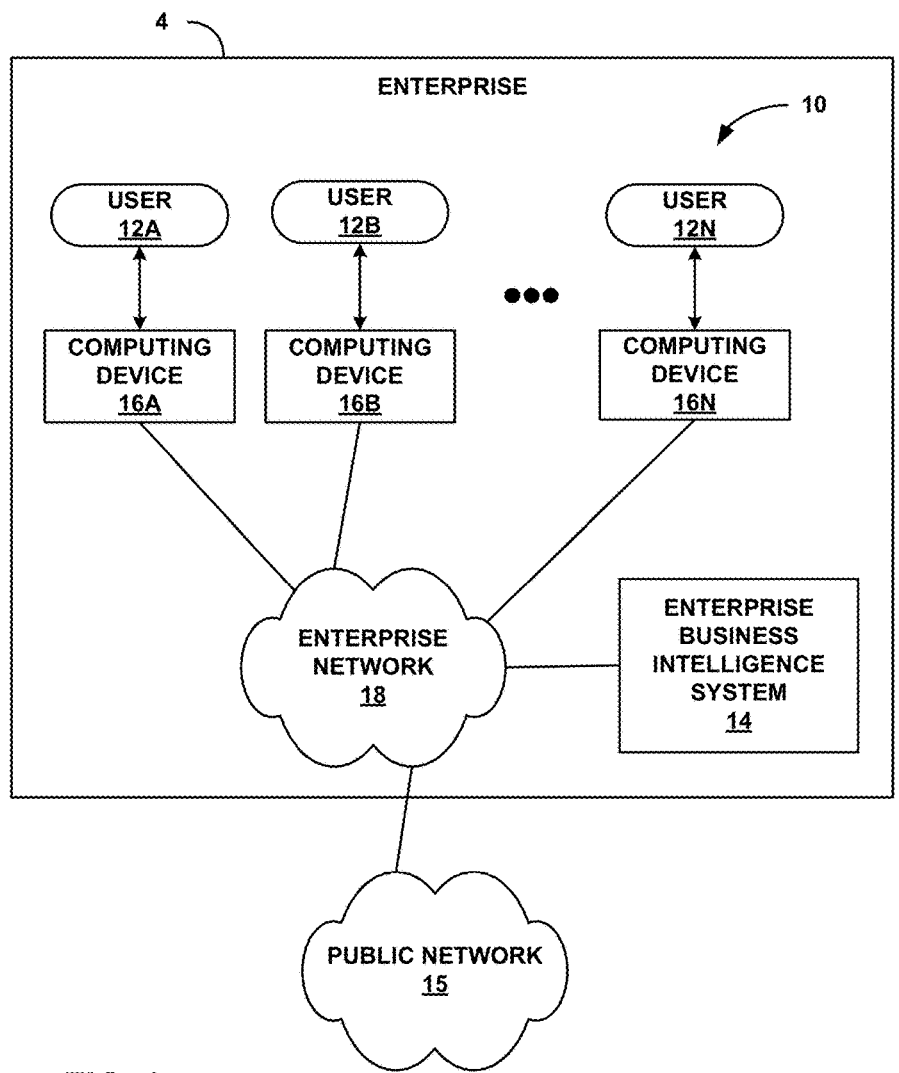
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In accordance with aspects of the present disclosure, enterprise business intelligence system 14 may receive a natural language query. Business intelligence system 14 may determine, based on the natural language query, a set of search criteria. Business intelligence system 14 may determine, from a plurality of data sets stored in one or more storage devices, two or more data sets that are relevant to the natural language query based at least in part on matches between the set of search criteria and attributes of the plurality of data sets. Business intelligence system 14 may join the two or more data sets, including joining one or more rows and one or more columns of the two or more data sets to produce a joint data set. Business intelligence system 14 may output a representation of the joint data set.

Figure 2:
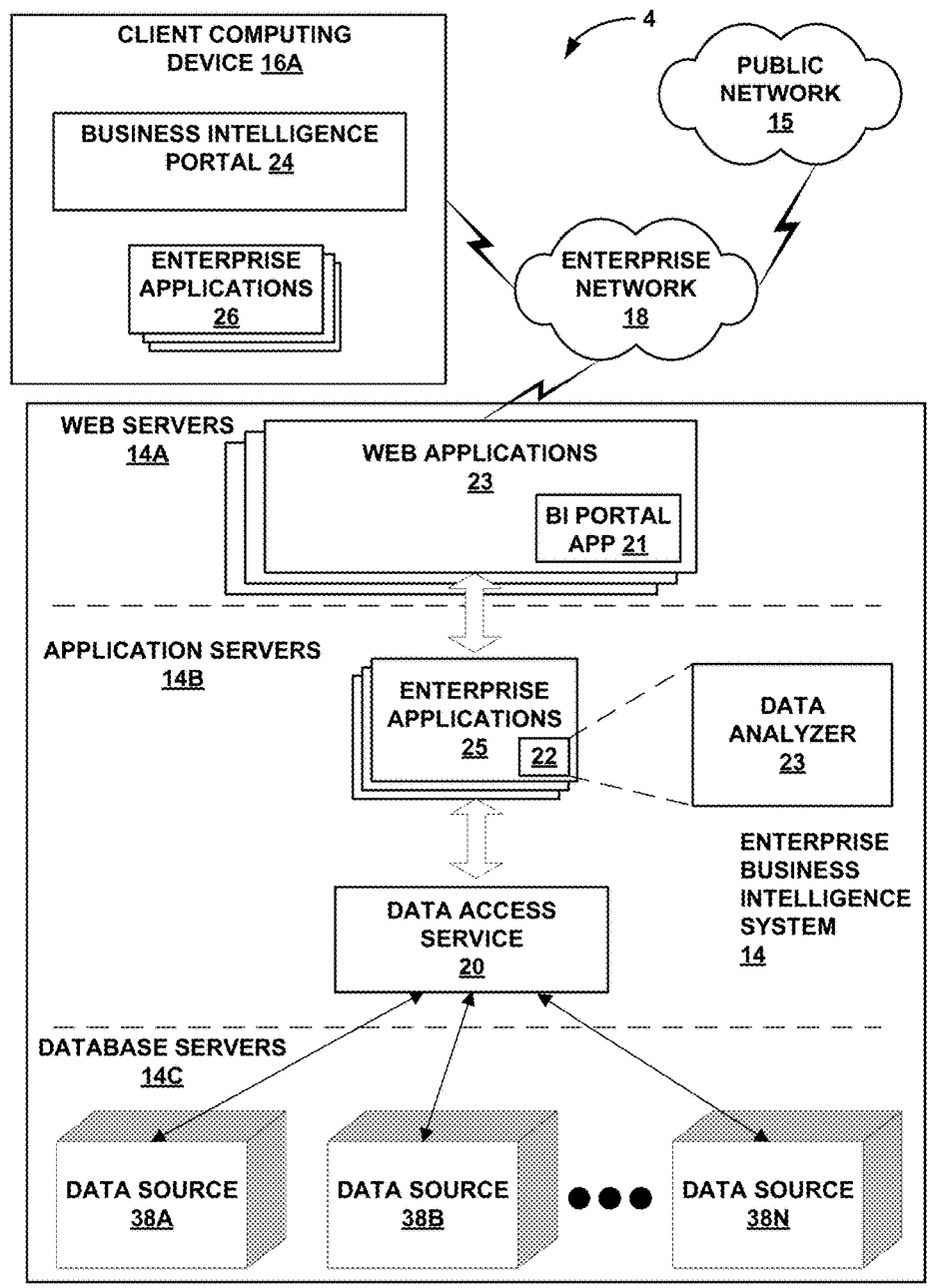
FIG. 2 is a block diagram illustrating in further detail portions of one embodiment of the enterprise business intelligence system shown in FIG. 1.

FIG. 2 is a block diagram illustrating in further detail portions of one embodiment of enterprise business intelligence (BI) system 14 shown in FIG. 1. In this example implementation, a single client computing device 16A is shown for purposes of illustration and includes a BI portal 24 and one or more client-side enterprise software applications 26 through which a user may enter a natural language query for data, and through which the user may view a joint data set that is returned by enterprise business intelligence system 14 in response to the natural language query. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

In some examples, BI portal 24 may output data visualizations of the joint data set for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15.

FIG. 2 depicts additional detail for enterprise business intelligence system 14 and how it may be accessed via interaction with a BI portal 24 for querying business intelligence system 14 and for depicting and providing visualizations of business data in response to the querying. BI portal 24 may receive a natural language query, and business intelligence system 14 may provide an indication of data that are relevant to the query from any of a variety of types of data sources, such as a BI report, a software application, a database, a spreadsheet, a data structure, a flat file, Extensible Markup Language ("XML") data, a comma separated values (CSV) file, a data stream, unorganized text or data, or other type of file or resource.

Data analyzer 23 may receive the natural language query, analyze the natural language query to determine a set of search criteria, and may, based on the semantic annotation of the data sets included in the data sources, determine the data sets that are potentially most relevant to the natural language query. Data analyzer 23 may be hosted among enterprise applications 25, as in the example depicted in FIG. 2, or may be hosted elsewhere, including on a client computing device 16A, or distributed among various computing resources in enterprise business intelligence system 14, in some examples. Data analyzer 23 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include data analyzer 23 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. Multidimensional data structures are "multidimensional" in that each multidimensional data element is defined by a plurality of different object types, where each object is associated with a different dimension. As yet another example, the data sources 38 may be two-dimensional relational databases configured to receive and execute SQL queries, also with an arbitrary level of complexity.

Data sources 38 may include structured or semi-structured data sets that contain information, such as business information. Data set 1 below is a sample of an example data set that contains information about the climate history in Canada:

Data Set 1

| Year | Month | City | Avg. Temp. (F.) | Precipitation (in.) |
|------|----------|---------|-----------------|---------------------|
| 2013 | January | Toronto | 33 | 1.4 |
| 2013 | January | Ottawa | 25 | 3 |
| 2013 | February | Toronto | 33 | 1.1 |
| 2013 | February | Ottawa | 28 | 2.1 |

Data set 2 below is a sample of an example data set that contains information about product sales:

Data Set 2

| Product Type | Year | Month | City | Quantity | Revenue |
|--------------|------|----------|---------|----------|--------------|
| Snowboard | 2013 | January | Toronto | 204 | $102,000.00 |
| Swimsuit | 2013 | January | Toronto | 62 | $6,2000.00 |
| Snowboard | 2013 | January | Ottawa | 143 | $71,400.00 |
| Swimsuit | 2013 | January | Ottawa | 37 | $3,720.00 |
| Snowboard | 2013 | February | Toronto | 183 | $91,500.00 |
| Swimsuit | 2013 | February | Toronto | 68 | $6,800.00 |

The enterprise applications 26 on client computing device 16A may issue business queries to enterprise business intelligence system 14 to build reports. These business queries may be natural language queries entered by the user of computing device 16A. Some examples of natural language queries may include "time spent watching TV in 2003 and 2012," "how many of our clients appear in the Fortune 500 list," "products sold by Far East office in the last two years," and "how does temperature impact product sales." Natural language queries may also be referred to as search phrases. Enterprise business intelligence system 14 includes data analyzer 23 that analyzes the search phrase and determines the most relevant data sets from data sources 38 to best answer the query. Client computing device 16A may transmit search phrases through enterprise network 18 to data analyzer 23. Data analyzer 23 may decompose the search phrase down into its elements. Data analyzer 23 may decompose the search phrase along word boundaries. Data analyzer 23 may also decompose the search phrase into a set of search criteria along a combination of words as warranted, such as if the combination of words match a data item name or specific values of data sets in data sources 39. Data analyzer 23 may also perform word stemming of the decomposed words or combination of words.

Data analyzer 23 may determine data sets in data sources 39 that are relevant to the search phrase based at least in part on a semantic annotation of data items of each data set in data sources 39. Details of how business intelligence system 14 may perform such a semantic annotation of data sets in data sources 39 are described in U.S. patent Ser. No. 13/844,612, which is incorporated herein by reference. Data analyzer 23 may perform a matching of the set of criteria determined from the search phrase with the semantic annotations of data items of each data set in data sources 39 to determine a relevancy score for each data set in data sources 39. Data analyzer 23 may rank the data sets in data sources 39 based at least in part on the relevancy scores and may further determine a coverage score for combinations of data sets to determine whether combining multiple data sets may provide a more relevant answer to the search phrase.

If data analyzer 23 determines that a combination of two or more data sets in data sources 39 may provide the most relevant answer to the search phrase compared with other combinations of two or more data sets in data source 39, data analyzer 23 may determine whether the two or more data sets can be joined into a joint data set as well as determine how to join the two or more data sets.

Data analyzer 23 may use data access service 20, which provides a logical interface to the data sources 38, to retrieve the two or more data sets that data analyzer 23 determines provides the most relevant answer to the search phrase. Data access service 20 may, for example, execute on the application servers intermediate to the enterprise software applications 25 and the underlying data sources in database servers 14C. Data access service 20 retrieves the data sets from the underlying data sources, in accordance with query specifications.

Data analyzer 23 may join the retrieved two or more data sets into a joint data set and may output a representation of the joint data set via BI portal app 21 which a user may view via BI portal 24 using client computing device 16A. The representation of the joint data set may include a visualization of the data set, such as charts, graphs, and the like of the joint data set, such as a chart of product revenue trend over time or to compare product revenues for a particular period of time, as illustrative examples.

Figure 3:
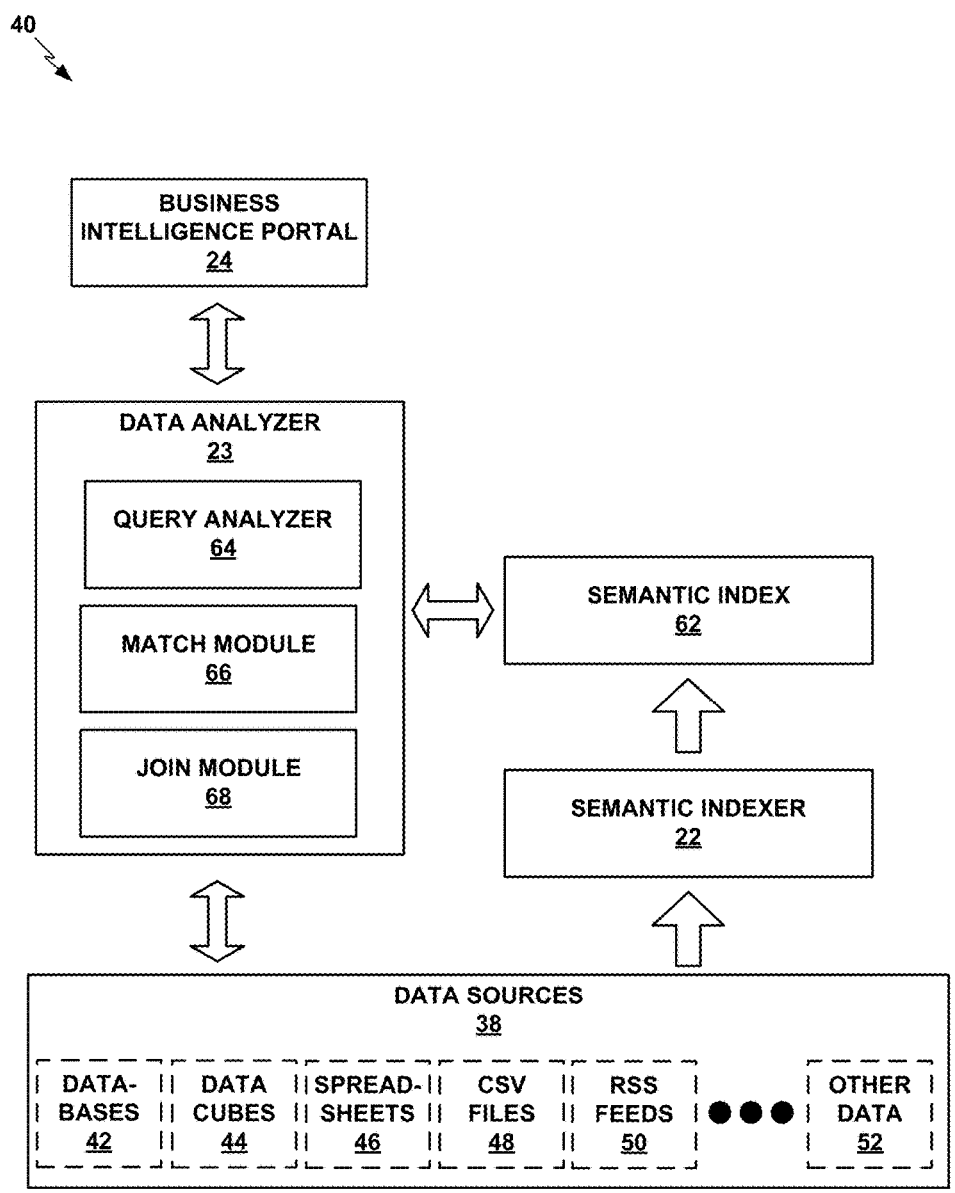
FIG. 3 is a block diagram illustrating an example of an overall architecture of a data analyzer in an operating context for returning a joint data set that is relevant to a natural language query in a business intelligence system.

FIG. 3 is a block diagram illustrating an overall architecture of a data analyzer in an operating context for returning a joint data set that is relevant to a natural language query in a business intelligence system. As shown in FIG. 3, data sources 38 may encompass databases 42, data cubes or multi-dimensional data structures 44, spreadsheets 46, comma separated value (CSV) files 48, really simple syndication (RSS) feeds 50, as well as other data sources 52, such as web pages, text files, multimedia files, and the like. Data sources 38 may be stored in an enterprise storage system, such as an enterprise storage system included in business intelligence system 14, as well as storage systems external to business intelligence system 14, such as web pages stored in external web servers.

Semantic indexer 22 may index and catalog data sets in data sources 38 to semantically annotate data items of the data sets and to store such semantic annotation in semantic index 62 as attributes of the data sets. Semantic indexer 22 may catalog data sets along lexical clues, semantic annotations, and statistically significant sample values and data and may store such semantic metadata, lexical clues, sample values, and numerical statistics into semantic index 62 as attributes of the data sets in data sources 38. For each data set, semantic indexer 22 may store into semantic index 62 various item headings in its raw form as well as in tokenized form, which may be used to look up data sets by name. For each data item, semantic indexer 22 may collect into semantic index 62 sample values, statistical values (e.g., min/max values), the set of unique values, and the total number of values. For each data set, semantic indexer 22 may also perform a semantic analysis to capture generic concepts as well as business concepts that explain what the data set is about. For example, for data set 1 and data set 2, the semantic analysis may identify and capture into semantic indexer 62 temporal concepts such as year and month, geographic concepts such as city, monetary metrics such as revenue, and units of measurement such as inch for precipitation and Fahrenheit for average temperature.

Data analyzer 23 may receive a natural language query via business intelligence portal 24. For example, a user may access business intelligence portal 24 via a web browser and may input a natural language query into a text input box of a web page presented by business intelligence portal 24. Examples of a natural language query may be "how does temperature impact product sales" or "products sold by Far East office in last two years."

Query analyzer 64 may parse the natural language query to determine a set of search criteria and to determine an estimate of the overall desired analysis. Parsing the natural language query may include decomposing the natural language query into elements along word boundaries or a combination of words. In the example of the natural language query of "how does temperature impact product sales," query analyzer 64 may decompose the query to a set of search criteria of {how, does, temperature, impact, product, sales} and may determine an overall desired analysis of the correlation of sales values with temperature. In the example of the natural language query of "products sold by Far East office in last two years," query analyzer may decompose the query to a set of search criteria of {product, sell, by, 'Far East', office, in, last, two, years} and may determine an overall desired analysis of the correlation of products sold by the Far East office with a time period of the last two years.

Match module 66 may determine matches between the set of search criteria derived from the natural language query and attributes stored in semantic index 62 of data sets in data sources 38. Matches between the set of search criteria and the attributes of data sets may include one or more of: a literal match, a value match, a semantic match, or a partial name match. A literal match may be a literal match between one of the search criteria with a particular label, such as a particular row, column, heading, and the like. For example, a search criterion of "year" may be a literal match with a "YEAR" data column. A value match may be a match between one of the search criteria with a set of data items that includes a particular value of a data item. For example, a "Far East" search criteria may be a value match with a "Sales Region" set of data items that includes a data item value of "Far East." A semantic match may be a match between one of the search criteria with a conceptually related set of data items. For example, a "client" search criteria may be a semantic match with "CUSTOMER_ID" or "CUSTOMER_NAME" data items. A partial name match may be a partial match between one of the search criteria and the names of a set of data items. For example, a "TV" search criteria may be a partial name match with data items with headings of "Television and Movies (Not Religious)" or "Television (Religious)."

Match module 66 may associate an indication of strength with each of the matches. The indication of strength may decrease in strength from literal matches to value matches to semantic matches to partial name matches, such that literal matches may be associated with a relatively higher indication of strength than value matches, and so on. Match module 66 may rank the matches based at least in part on the indication of matching strength associated with the respective matches. For example, a data set may include one or more groups of data items that match with the search criteria via one or more of literal matches, value matches, semantic matches, and/or partial name matches. Each of the matches may be weighted according to the indication of strength associated with the matches, such that literal matches may have greater weight than value matches and so on.

Match module 66 may determine an overall relevance for each of the data sets based at least in part on an aggregation of the weighted individual matches between the set of search criteria with the attributes of data sets, and may rank the data sets in data source 38 based at least in part on the overall relevance of each of the data sets. In this way, match module 66 may determine, based on the ranking, which of the data sets are relatively more relevant to the set of search criteria.

Match module 66 may determine coverage scores for data sets in data sources 38. The coverage score for a data set may be determined as a percentage of the natural language query that is bound to one or more attributes associated with the data set. Match module 66 may also determine coverage scores for each of one or more combinations of two or more data sets to determine whether a combination of two or more data sets may yield a higher coverage score than any single data set. For example, given the natural language query of "how does temperature impact product sales," data set 1 may be able to cover the search criteria of "temperature" while data set 2 may be able to cover the search criteria of "product sales." By combining data set 1 and data set 2, the combination of the data sets may be able to cover both "temperature" and "product sales," thereby yielding a higher coverage score than data sets 1 or 2 by itself.

As such join module 68 may determine one of the one or more combinations of two or more data sets as the two or more data sets to join into the joint data set based at least in part on the determined coverage score for the one of the one or more combinations of two or more data sets. In the example of FIG. 3, join module 68 may determine the combination of data set 1 and data set 2 as two or more data sets to join into a joint data set based at least in part on the coverage score determined by match module 66 for the combination of data sets 1 and 2.

If join module 68 determines that joining a combination of two or more data sets may provide a relatively higher coverage score, join module 68 may determine whether the two or more data sets can be joined together as well as how to join the two or more data sets. Join module 68 may operate based on a set of heuristic rules to determine a join path for joining two or more data sets, and may build an on-the-fly query to retrieve the set of data items from data sources 38 that make up the joint data set.

A join path between two or more data sets may be a set of data items of the data sets which may be joined together to form a joint set of data items. For example, rows of data items from each of the two or more data sets may be joined together, or columns of data items from each of the two or more data sets may be joined together. As such, joining two or more data sets may include joining one or more rows and one or more columns of the two or more data sets based at least in part on a determined join path to produce a joint data path.

Join module 68 may determine a join path between two or more data sets that include matching data items in the two or more data sets. For example, a years column from a first data set may be joined with a years column from a second data set to produce a joint years column.

Join module 68 may also determine a join path between two or more data sets that include value overlaps in the two or more data sets. In the example of joining a year column from a first data set with a year column from a second data set, join module 68 may join the respective year columns if and only if there are value overlaps between the respective year columns. For example, if the year column of the first data set ranges from 2005 to 2008, and if the years column of the second data set ranges from 2007 to 2013, join module 68 may be able to join these year columns. Conversely, join module 68 may determine not to join the year column from the first data set with the year column from the second data set if the values of the respective year columns do not overlap, such as if the year column of the first data set ranges from 2005 to 2008, and if the years column of the second data set ranges from 2009 to 2013.

Join module 68 may exclude metric items from being included in join paths because joining metric items such as revenue, quantity, or temperature is rarely desirable.

Join module 68 may also determine one or more join paths of the data items between the two or more data sets is based at least in part on concept-specific rules, which may be specialized rules that depend upon specific concepts detected from data items. For example, data items with temporal concepts, such as dates, may not be good join path candidates by themselves without other data items that are also included in the join path because it may lead to false positives as any data set with dates may potentially be joined together. However, if date attributes are the unique key of a data set, the data set may most likely be a transitional data set, and in this case the date attributes may be a good join path candidate.

Figure 4A:
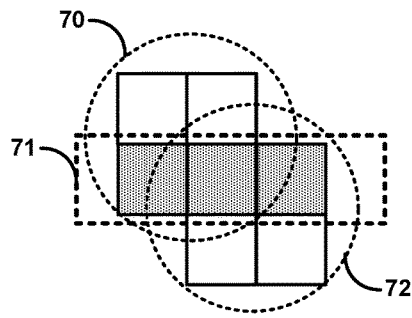
FIGS. 4A-4E are block diagrams illustrating examples of joining two or more data sets into a joint data set.
Figure 4B:
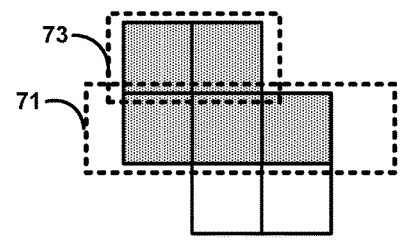
Figure 4C:
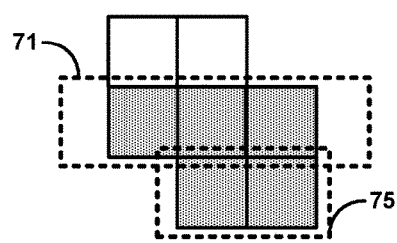
Figure 4D:
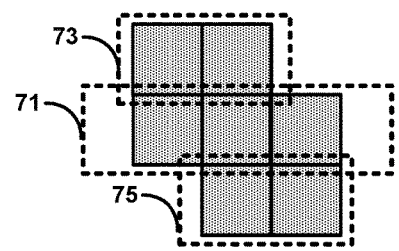

FIGS. 4A-4E are block diagrams illustrating examples of joining two or more data sets into a joint data set. As shown in FIG. 4A, given example data sets 70 and 72, each of which includes two rows and two columns, join module 68 may determine a join path between data sets 70 and 72 that includes one or more matching rows. In the example of FIG. 4A, join module 68 may join data sets 70 and 72 by determining a row in data sets 70 and 72 which may be joined together into matching row 71. In the example of FIG. 1, matching row 71 may be the only row of data sets 70 and 72 that is included in the joint data set. As shown in FIG. 4B, in some examples, in addition to matching row 71, rows of data set 70 or data set 72 may be included in the joint data set resulting from joining data sets 70 and 72. For example, the joint data set resulting from joining data sets 70 and 72 may include matching row 71 as well as row 73 from data set 70. As shown in FIG. 4C, in another example, the joint data set resulting from joining data sets 70 and 72 may include matching row 71 as well as row 75 from data set 72. As shown in FIG. 4D, in another example, the joint data set resulting from joining data sets 70 and 72 may include matching row 71 as well as row 73 from data set 70 and row 75 from data set 72.

Figure 4E:
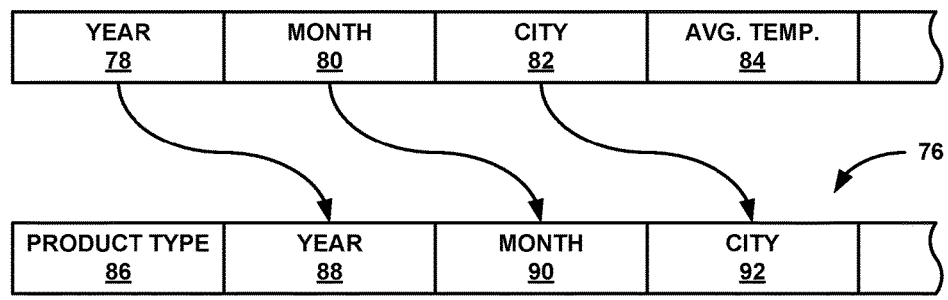

As shown in FIG. 4E, join module 68 may also determine a join path between data sets that include one or more matching columns. Columns 74 may represent the columns of dataset 1 and columns 76 may represent the columns of data set 2. Columns 74 may include year column 78, month column 80, city column 82, and average temperature column 84, while columns 76 may include product type column 86, year column 88, month column 90, and city column 92. Join module 68 may join year column 78 with year column 88, month column 80 with month column 90, and city column 82 with city column 92.

Items participating in the join path may not necessarily be the same items that are bound to the natural language query. For example, although the natural language query of "how does temperature impact product sales" does not mention year, month, or city, join module 68 may nonetheless include year columns 78 and 88, month columns 80 and 90, and city columns 82 and 92 into join paths for data set 1 and data set 2.

Join module 68 may determine one or more candidate join paths between attributes of two or more data sets and may, in some examples, present the one or more candidate join paths to a user for user confirmation of the one or more join paths between the two or more data sets. Join module 68 may receive user input that adjusts the one or more candidate join paths and may adjust the one or more candidate join paths based at least in part on the user input to determine one or more join paths between the two or more data sets.

In determining join paths between data sets and producing a joint data set, join module 68 may determine how best to correctly integrate and aggregate metrics between data sets. The following two example data sets may be data sets that join module 68 is attempting to join into a joint dataset:

Product Sales Data Set

| Year | Quarter | Line | Brand | Item | Revenue |
|---|---|---|---|---|---|
| 2010 | Q1 2010 | Camp. Equi. | Cooking | Water Bag | 10,842,32 |
| 2010 | Q1 2010 | Camp. Equi. | Cooking | Canteen | 6,796.95 |
| 2010 | Q1 2010 | Camp. Equi. | Cooking | Cup | 3,148.85 |
| 2010 | Q1 2010 | Camp. Equi. | Packs | Climber | 20,943.64 |
| 2010 | Q1 2010 | Camp. Equi. | Packs | Journey | 47,251.30 |
| 2010 | Q1 2010 | Camp. Equi. | Packs | Cooler | 14,628.42 |
| 2010 | Q1 2010 | Camp. Equi. | Packs | Carryall | 24,677.96 |
| 2010 | Q1 2010 | Camp. Equi. | Lanterns | Firefly 4 | 5,712.00 |
| 2010 | Q1 2010 | Camp. Equi. | Lanterns | Single | 20,592.36 |
| 2010 | Q1 2010 | Camp. Equi. | Lanterns | Double | 2,580.09 |
| 2010 | Q1 2010 | Camp. Equi. | Lanterns | Kerosene | 20,318.40 |
| 2010 | Q1 2010 | Camp. Equi. | Lanterns | Butane | 6,928.90 |
| 2010 | Q1 2010 | Personal | Eyewear | Maximus | 7,680.00 |
| 2010 | Q1 2010 | Personal | Eyewear | Trendi | 8,845.20 |

Product Sales Forecast Data Set

| Year | Quarter | Line | Brand | Forecast |
|---|---|---|---|---|
| 2010 | Q1 2010 | Camp. Equi. | Cooking | 3,410,842.32 |
| 2010 | Q1 2010 | Camp. Equi. | Packs | 2,414,628.42 |
| 2010 | Q1 2010 | Camp. Equi. | Lanterns | 96,928.90 |
| 2010 | Q1 2010 | Camp. Equi. | Tents | 3,286,648.80 |
| 2010 | Q1 2010 | Camp. Equi. | Sleeping Bags | 6,746,350.09 |
| 2010 | Q1 2010 | Personal | Knives | 1,112,651.40 |
| 2010 | Q1 2010 | Personal | Binoculars | 4,514,880.00 |
| 2010 | Q1 2010 | Personal | Navigation | 147,665.00 |
| 2010 | Q1 2010 | Personal | Eyewear | 666,751.80 |
| 2010 | Q1 2010 | Personal | Watches | 3,323,730.00 |
| 2010 | Q1 2010 | Golf Equip. | Woods | 67,126,484.70 |

As shown above, while revenue values are repeated along individual items in the Product Sales Data Set, the forecast values are repeated along brands in the Product Sales Forecast Data Set. If join module 68 joins the Product Sales Data Set with the Product Sales Forecast Data Set by matching the Line and Brand columns for each data set, there are multiple corresponding rows in the Product Sales Data Set for every unique combination of Line and Brand columns in the Product Sales Forecast Data Set. As such, join module 68 may determine which forecast values to show for each product item based at least in part on metadata models for the Product Sales Data Set and the Product Sales Forecast Data Set.

Figure 5:
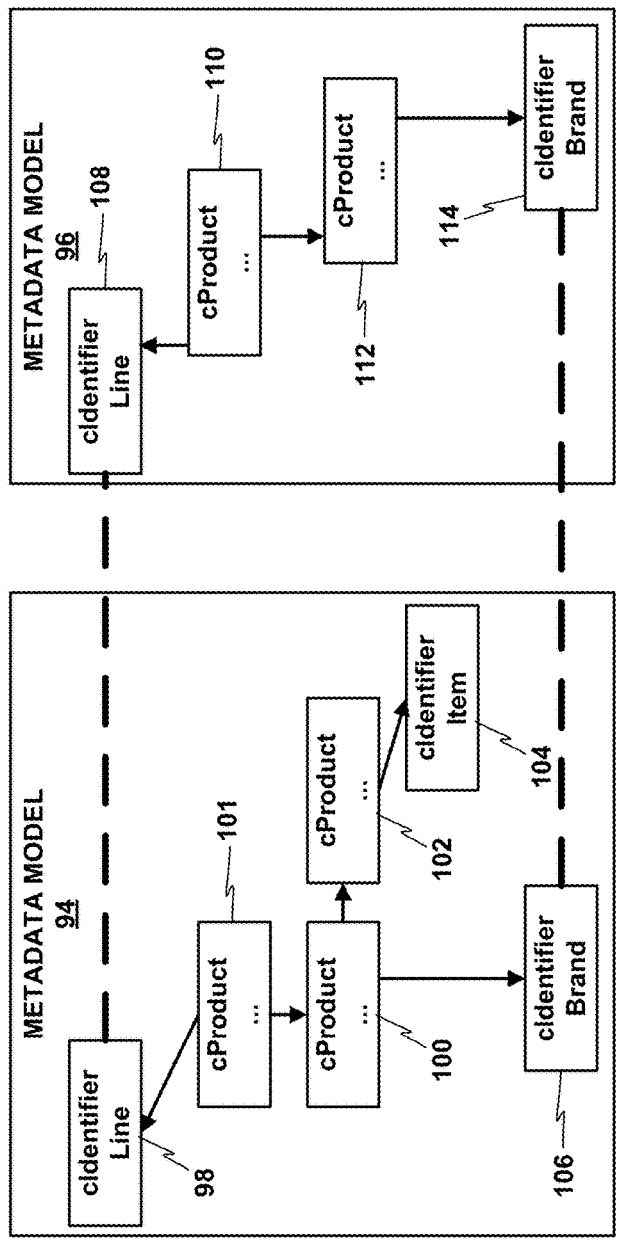
FIG. 5 is a block diagram illustrating example metadata models used by a join module.

FIG. 5 is a block diagram illustrating example metadata models used by join module 68. As shown in FIG. 5, metadata model 94 may be a metadata model of the Product Sales Data Set and metadata model 96 may be a metadata model of the Product Sales Forecast Data Set. Semantic indexer 22 may construct metadata models 94 and 96 and may store the metadata models 94 and 96 in semantic index 62. cIdentifier Line 98, cIdentifier Item 104, cIdentifier Brand 106, cIdentifier Line 108, and cIdentifier Brand 114 may be data items, and cProduct 100, cProduct 101, cProduct 102, cProduct 110, and cProduct 112 may be product categories associated with the aforementioned data items. The arrowed lines connecting cProduct 100, cProduct 101, cProduct 102, cProduct 110, and cProduct 112 may indicate a data hierarchy, which is a one-to-many association. Join module 68 may determine, based on metadata models 94 and 96, that Product Sales Data Set includes a three-level deep hierarchy of Line→Brand→Item while Product Sales Forecast Data Set includes a two-level deep hierarchy of Line→Brand. Join module 68 may thus determine to repeat the forecast value for each item under a single brand in the joint data set.

Responsive to determining the joint data set, join module 68 may query data sources 38, such as via data access service 20, to retrieve the data items comprising the joint data set. The query may specify which data items of which data sets to return from data sources 38, including specifying the ranges of the specified data items to return from data sources 38. The query may further specify how the data items returned from data sources 38 are merged and/or arranged. Data analyzer 23 may output a representation of the joint data set via business intelligence portal 24, so that client computing device 16A may access and view the representation of the joint data set. The representation of the joint data set outputted by business intelligence portal 24 may be a logical merged view of the joint data set, such as a spreadsheet view of the rows and columns of the joint data set. Alternatively, the representation of the joint data set may include a visualization of the data included in the joint data set.

Figure 6A:
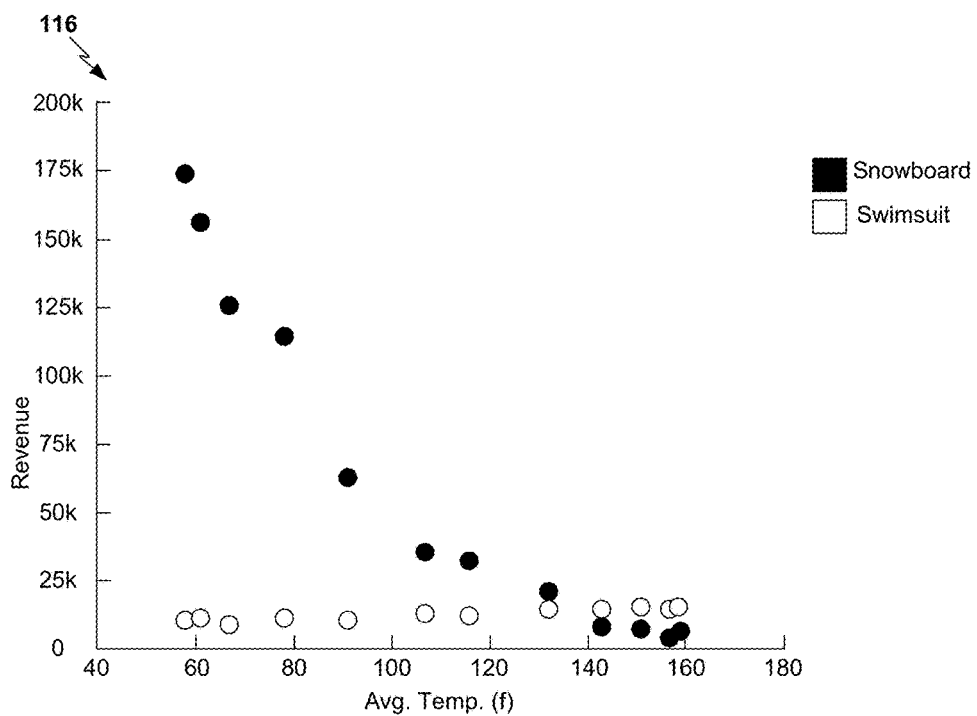
FIGS. 6A and 6B illustrate example visualizations of joint data sets.
Figure 6B:
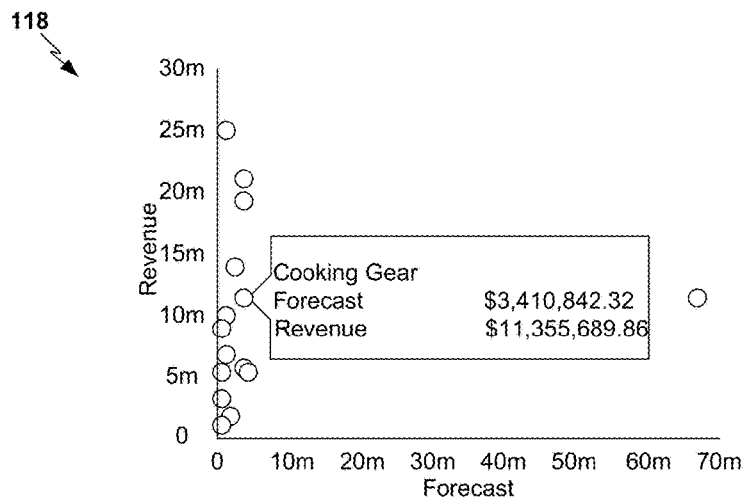

FIGS. 6A and 6B illustrate example visualizations of joint data sets. As shown in FIG. 6A, business intelligence portal 24 may output graph 116, which may be a graph of a joint data set which is a combination of data set 1 and data set 2 to answer the natural language query of "how does temperature impact product sales." As shown in FIG. 6B, business intelligence portal 24 may output graph 118, which may be a graph of a joint data set which is a combination of the Product Sales Data Set and the Sales Forecast Data Set.

Figure 7:
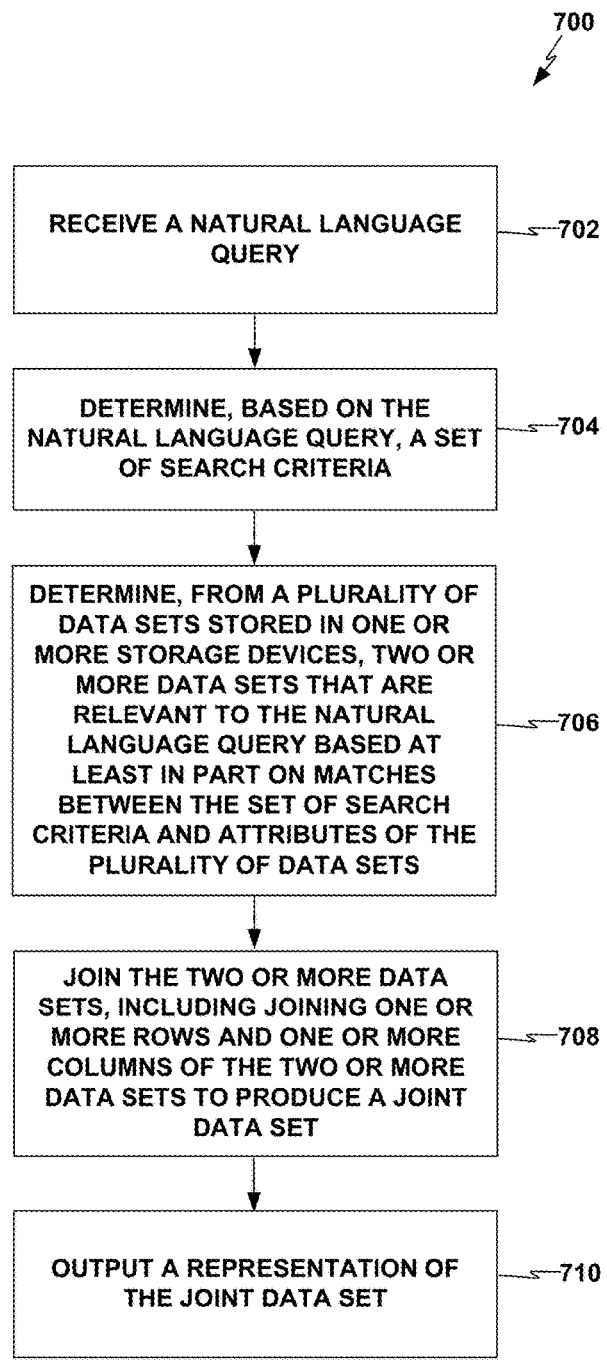
FIG. 7 is a flowchart illustrating an example process that a data analyzer, executing on one or more computing devices, may perform.

FIG. 7 is a flowchart illustrating an example process 700 that data analyzer 23, executing on one or more computing devices (e.g., servers, computers, processors, and the like), may perform. Data analyzer 23 may receive a natural language query (702). Data analyzer 23 may determine, based on the natural language query, a set of search criteria (704). Data analyzer 23 may determine, from a plurality of data sets stored in one or more storage devices, two or more data sets that are relevant to the natural language query based at least in part on matches between the set of search criteria and attributes of the plurality of data sets (706). Data analyzer 23 may join the two or more data sets, including joining one or more rows and one or more columns of the two or more data sets to produce a joint data set (708). Data analyzer 23 may output a representation of the joint data set (710).

In some examples, the matches between the set of search criteria and the attributes of the plurality of data sets include one or more of: a literal match, a value match, a semantic match, and a partial name match, and wherein the attributes of the plurality of data sets include one or more of: semantic metadata, lexical clues, sample values, and numeric statistics. In some examples, data analyzer 23 may associate an indication of matching strength with each of the matches and may rank the matches based on the indication of matching strength associated with the respective matches.

In some examples, data analyzer 23 may determine a coverage score for each of one or more combinations of two or more data sets of the plurality of data sets based at least in part on the ranking of the matches and may determine one of the one or more combinations of two or more data sets as the two or more data sets to join into the joint data set based at least in part on the determined coverage score for the one of the one or more combinations of two or more data sets. In some examples, determining the one of the one or more combinations of two or more data sets as the two or more data sets to join into the joint data set may include determining one or more join paths of data items between the two or more data sets. In some examples, data analyzer 23 may join the two or more data sets, including joining the one or more rows and the one or more columns of the two or more data sets to produce the joint data set further comprises joining the two or more data sets based at least in part on the one or more join paths.

In some examples, the one or more join paths may include value overlaps in the two or more data sets. In some examples, the one or more join paths may include matching data items in the two or more data sets. In some examples, determining one or more join paths of the data items between the two or more data sets is based at least in part on concept-specific rules. In some examples, determining one or more join paths of the data items between the two or more data sets may include excluding metric data items from the one or more join paths. In some examples, determining one or more join paths of the data items between the two or more data sets may include adjusting the one or more join paths based at least in part on user input.

Figure 8:
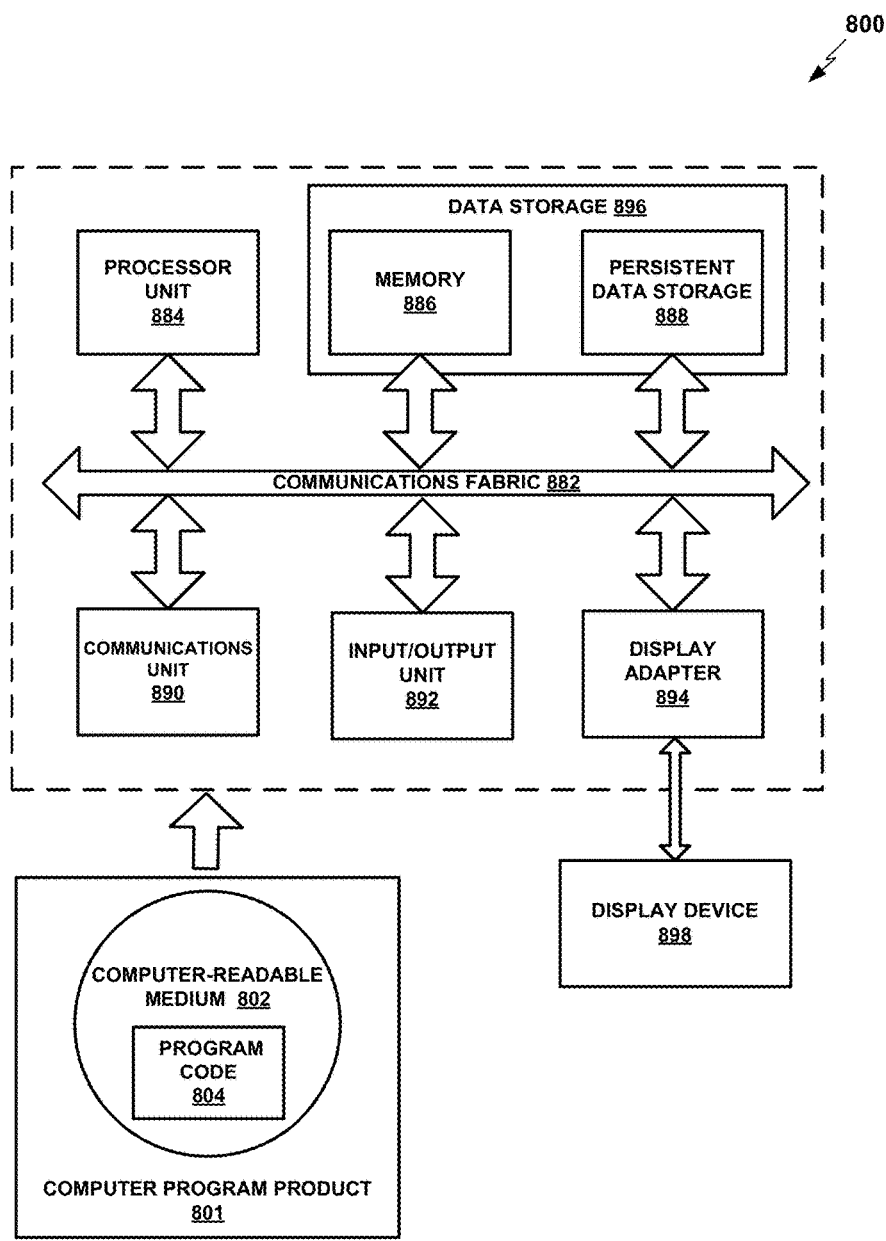
FIG. 8 is a block diagram of a computing device that may be used to execute a data analyzer, according to an illustrative example.

FIG. 8 is a block diagram of a computing device 800 that may be used to execute data analyzer 23, according to an illustrative example. Computing device 800 may be a server such as described above with reference to FIG. 2, including one or more of web servers 14A, application servers 14B, and database servers 14C. Computing device 800 may also be any server for providing data analyzer 23 in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 800 may include a computer having capabilities or formats other than or beyond those described herein.

In the illustrative example of FIG. 8, computing device 800 includes communications fabric 882, which provides communications between processor unit 884, memory 886, persistent data storage 888, communications unit 890, and input/output (I/O) unit 892. Communications fabric 882 may include a dedicated system bus, a general system bus, multiple buses arranged in hierarchical form, any other type of bus, bus network, switch fabric, or other interconnection technology. Communications fabric 882 supports transfer of data, commands, and other information between various subsystems of computing device 800.

Processor unit 884 may be a programmable central processing unit (CPU) configured for executing programmed instructions stored in memory 886. In another illustrative example, processor unit 884 may be implemented using one or more heterogeneous processor systems in which a main processor is present with secondary processors on a single chip. In yet another illustrative example, processor unit 884 may be a symmetric multi-processor system containing multiple processors of the same type. Processor unit 884 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 884 may include a multi-core processor, such as a dual core or quad core processor, for example. Processor unit 884 may include multiple processing chips on one die, and/or multiple dies on one package or substrate, for example. Processor unit 884 may also include one or more levels of integrated cache memory, for example. In various examples, processor unit 884 may comprise one or more CPUs distributed across one or more locations.

Data storage 896 includes memory 886 and persistent data storage 888, which are in communication with processor unit 884 through communications fabric 882. Memory 886 can include a random access semiconductor memory (RAM) for storing application data, i.e., computer program data, for processing. While memory 886 is depicted conceptually as a single monolithic entity, in various examples, memory 886 may be arranged in a hierarchy of caches and in other memory devices, in a single physical location, or distributed across a plurality of physical systems in various forms. While memory 886 is depicted physically separated from processor unit 884 and other elements of computing device 800, memory 886 may refer equivalently to any intermediate or cache memory at any location throughout computing device 800, including cache memory proximate to or integrated with processor unit 884 or individual cores of processor unit 884.

Persistent data storage 888 may include one or more hard disc drives, solid state drives, flash drives, rewritable optical disc drives, magnetic tape drives, or any combination of these or other data storage media. Persistent data storage 888 may store computer-executable instructions or computer-readable program code for an operating system, application files comprising program code, data structures or data files, and any other type of data. These computer-executable instructions may be loaded from persistent data storage 888 into memory 886 to be read and executed by processor unit 884 or other processors. Data storage 896 may also include any other hardware elements capable of storing information, such as, for example and without limitation, data, program code in functional form, and/or other suitable information, either on a temporary basis and/or a permanent basis.

Persistent data storage 888 and memory 886 are examples of physical, tangible, non-transitory computer-readable data storage devices. Data storage 896 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 884 can also be suitably programmed to read, load, and execute computer-executable instructions or computer-readable program code for data analyzer 23, as described in greater detail above. This program code may be stored on memory 886, persistent data storage 888, or elsewhere in computing device 800. This program code may also take the form of program code 804 stored on computer-readable medium 802 comprised in computer program product 800, and may be transferred or communicated, through any of a variety of local or remote means, from computer program product 800 to computing device 800 to be enabled to be executed by processor unit 884, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 884 can be suitably programmed to read, load, and execute instructions of the operating system.

Communications unit 890, in this example, provides for communications with other computing or communications systems or devices. Communications unit 890 may provide communications through the use of physical and/or wireless communications links. Communications unit 890 may include a network interface card for interfacing with enterprise network 18, public network 15, an Ethernet adapter, a Token Ring adapter, a modem for connecting to a transmission system such as a telephone line, or any other type of communication interface. Communications unit 890 can be used for operationally connecting many types of peripheral computing devices to computing device 800, such as printers, bus adapters, and other computers. Communications unit 890 may be implemented as an expansion card or be built into a motherboard, for example.

The input/output unit 892 can support devices suited for input and output of data with other devices that may be connected to computing device 800, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 892 may also include any type of interface for video output in any type of video output protocol and any type of monitor or other video display technology, in various examples. It will be understood that some of these examples may overlap with each other, or with example components of communications unit 890 or data storage 896. Input/output unit 892 may also include appropriate device drivers for any type of external device, or such device drivers may reside elsewhere on computing device 800 as appropriate.

Computing device 800 also includes a display adapter 894 in this illustrative example, which provides one or more connections for one or more display devices, such as display device 898, which may include any of a variety of types of display devices. It will be understood that some of these examples may overlap with example components of communications unit 890 or input/output unit 892. Input/output unit 892 may also include appropriate device drivers for any type of external device, or such device drivers may reside elsewhere on computing device 800 as appropriate. Display adapter 894 may include one or more video cards, one or more graphics processing units (GPUs), one or more video-capable connection ports, or any other type of data connector capable of communicating video data, in various examples. Display device 898 may be any kind of video display device, such as a monitor, a television, or a projector, in various examples.

Input/output unit 892 may include a drive, socket, or outlet for receiving computer program product 801, which comprises a computer-readable medium 802 having computer program code 104 stored thereon. For example, computer program product 801 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 802 may include any type of optical, magnetic, or other physical medium that physically encodes program code 804 as a binary series of different physical states in each unit of memory that, when read by computing device 800, induces a physical signal that is read by processor 884 that corresponds to the physical states of the basic data storage elements of storage medium 802, and that induces corresponding changes in the physical state of processor unit 884. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 884, thereby physically causing or configuring processor unit 884 to generate physical outputs that correspond to the computer-executable instructions, in a way that causes computing device 800 to physically assume new capabilities that it did not have until its physical state was changed by loading the executable instructions comprised in program code 804.

In some illustrative examples, program code 804 may be downloaded over a network to data storage 896 from another device or computer system for use within computing device 800. Program code 804 comprising computer-executable instructions may be communicated or transferred to computing device 800 from computer-readable medium 802 through a hard-line or wireless communications link to communications unit 890 and/or through a connection to input/output unit 892. Computer-readable medium 802 comprising program code 804 may be located at a separate or remote location from computing device 800, and may be located anywhere, including at any remote geographical location anywhere in the world, and may relay program code 804 to computing device 800 over any type of one or more communication links, such as the Internet and/or other packet data networks. The program code 804 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 804 may be transmitted from a source computer-readable medium 802 over non-tangible media, such as communications links or wireless transmissions containing the program code 804. Program code 804 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 800.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
receiving, by a computing device, a natural language query;
determining, by the computing device and based on the natural language query, a set of search criteria;
determining, by the computing device, a respective coverage score for each of a plurality of data sets and for each of one or more combinations of two or more data sets based at least in part on matches between the set of search criteria and attributes of the plurality of data sets and of the one or more combinations of two or more data sets, wherein the respective coverage score for a respective one of the plurality of data sets corresponds to a percentage of the natural language query that is bound to one or more attributes of the respective one of the plurality of data sets, and wherein the respective coverage score for a respective one of the one or more combinations of two or more data sets corresponds to the percentage of the natural language query that is bound to one or more attributes of the respective one of the one or more combinations of two or more data sets;
in response to determining a combination of two or more data sets out of the one or more combinations of two or more data sets that are associated with the natural language query based at least in part on the respective coverage score of the combination of two or more data sets, building, by the computing device, an on-the-fly query to join two or more data sets making up the combination of two or more data sets, including joining at least one of: two or more rows and two or more columns of the two or more data sets, to produce a joint data set;
executing, by the computing device, the on-the-fly data source query to retrieve the joint data set from the one or more data sources; and
outputting, by the computing device, a representation of the joint data set for display at a display device.

2. The method of claim 1,
wherein the matches between the set of search criteria and the attributes of the plurality of data sets include one or more of: a literal match, a value match, a semantic match, or a partial name match, and
wherein the attributes of the plurality of data sets include one or more of: semantic metadata, lexical clues, sample values, or numeric statistics.

3. The method of claim 2, further comprising:
associating, by the computing device, an indication of matching strength with each of the matches; and
ranking, by the computing device, the matches based on the respective indication of matching strength associated with each of the matches.

4. The method of claim 3, further comprising:
determining, by the computing device, the respective coverage score for each of the one or more combinations of two or more data sets of the plurality of data sets based at least in part on the ranking of the matches.

5. The method of claim 4, wherein:
building, by the computing device, the on-the-fly data source query to join the two or more data sets making up the combination of two or more data sets further comprises determining one or more join paths of data items between the two or more data sets; and
building, by the computing device, the on-the-fly data source query to join the two or more data sets making up the combination of two or more data sets further comprises building the on-the-fly data source query to join the two or more data sets based at least in part on the one or more join paths.

6. The method of claim 5, wherein the one or more join paths includes value overlaps in the two or more data sets.

7. The method of claim 5, wherein the one or more join paths includes matching data items in the two or more data sets.

8. The method of claim 5, wherein determining the one or more join paths is based at least in part on concept-specific rules.

9. The method of claim 5, wherein determining the one or more join paths further comprises excluding metric data items from the one or more join paths.

10. The method of claim 5, wherein determining the one or more join paths of the data items further comprises adjusting the one or more join paths based at least in part on user input.

* * * * *